(12) United States Patent
Nakano et al.

(10) Patent No.: US 7,729,034 B2
(45) Date of Patent: Jun. 1, 2010

(54) IONIC COLORED LIQUID AND IMAGE DISPLAY APPARATUS USING THE SAME

(75) Inventors: Shinich Nakano, Nara (JP); Hiroko Niwano, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 432 days.

(21) Appl. No.: 11/886,783

(22) PCT Filed: Mar. 16, 2006

(86) PCT No.: PCT/JP2006/305241
§ 371 (c)(1),
(2), (4) Date: Sep. 20, 2007

(87) PCT Pub. No.: WO2006/103946
PCT Pub. Date: Oct. 5, 2006

(65) Prior Publication Data
US 2009/0052004 A1    Feb. 26, 2009

(30) Foreign Application Priority Data
Mar. 25, 2005    (JP) ............................... 2005-090194

(51) Int. Cl.
*G02F 1/153* (2006.01)
(52) U.S. Cl. ................... 359/270; 359/665; 359/666
(58) Field of Classification Search ................ 359/270, 359/665, 666
See application file for complete search history.

(56) References Cited
U.S. PATENT DOCUMENTS

| | | | |
|---|---|---|---|
| 5,731,792 A | 3/1998 | Sheridon | |
| 6,603,444 B1 | 8/2003 | Kawanami et al. | |
| 6,828,062 B2 | 12/2004 | Lu et al. | |
| 2002/0177039 A1 | 11/2002 | Lu et al. | |
| 2005/0231840 A1* | 10/2005 | Steinfield et al. | ............. 359/886 |
| 2005/0285816 A1* | 12/2005 | Glass | ............................ 345/60 |
| 2006/0050359 A1 | 3/2006 | Takeyama | |
| 2006/0107793 A1 | 5/2006 | Yokoyama et al. | |

FOREIGN PATENT DOCUMENTS

| | | |
|---|---|---|
| EP | 0 806 753 A1 | 11/1997 |
| EP | 1 352 111 | 10/2003 |
| JP | 10-39799 | 2/1998 |
| JP | 2003-221526 | 8/2003 |
| JP | 2004-177755 | 6/2004 |
| JP | 2004-292632 | 10/2004 |

\* cited by examiner

*Primary Examiner*—Jordan M. Schwartz
*Assistant Examiner*—James C Jones
(74) *Attorney, Agent, or Firm*—Nixon & Vanderhye, P.C.

(57) ABSTRACT

An ionic colored liquid according to the present invention moves with a voltage application, and contains as principal components at least a coloring material whose base material is a pigment, and an ambient temperature molten salt combining a cation and an anion. The coloring material has a mean volume particle diameter of equal to or smaller than 5 μm and a coefficient of variation in a volume particle size distribution of equal to or smaller than 50. In an image display apparatus according to the present invention, a surface energy of the ionic colored liquid (21) is varied according to whether or not a voltage is applied to the ionic colored liquid (21), thereby moving the ionic colored liquid (21) or increasing/decreasing a surface area of the liquid on a display surface side, so that an image is displayed. In this manner, the ionic colored liquid can be dispersed stably in a dispersion medium and applied to an electric-field induction type electronic paper display or the like.

10 Claims, 3 Drawing Sheets

IONIC COLORED LIQUID AND IMAGE DISPLAY APPARATUS USING THE SAME

This application is the U.S. national phase of International Application No. PCT/JP2006/305241, filed 16 Mar. 2006, which designated the U.S. and claims priority to Japanese Patent Application No. 2005-090194, filed 25 Mar. 2005, the entire contents of each of which are hereby incorporated by reference.

TECHNICAL FIELD

The present invention relates to an ionic colored liquid and an image display apparatus using the above-mentioned colored liquid. More specifically, the present invention relates to an ionic colored liquid suitable for a sheet-like image display apparatus that utilizes an external electric field to move a liquid, thereby displaying an image, in particular, a full-color electronic paper display utilizing an electrowetting phenomenon, and an image display apparatus using the same.

BACKGROUND ART

Conventionally, electronic displays that utilize a moving phenomenon of a colored liquid for display have been suggested. Examples of a system that utilizes an external electric field to move a liquid, thus displaying an image, include an electroosmosis system and an electrowetting system.

The electrowetting system utilizes a phenomenon in which an electric field is applied to a liquid inside capillaries so as to vary an interfacial tension of the liquid, thus moving the liquid along through holes by an electrocapillary phenomenon, whereas the electric field is removed, thus causing the liquid to flow out of the capillaries. In this system, in a voltage-ON state where a switch between an electrode provided on an inner surface of the capillary and an external electrode is closed, the electric field is applied to the liquid, so that a wettability of the liquid with respect to the inner surface of the capillary varies. Accordingly, a contact angle of the liquid with respect to the inner surface of the capillary decreases, and based on this phenomenon, the liquid moves inside the capillary by the electrocapillary phenomenon. On the other hand, when the switch is opened to remove the application of electric field to the liquid, the wettability of the liquid with respect to the inner surface of the capillary varies, thus increasing the contact angle sharply, and based on this phenomenon, the liquid flows out of the capillary.

In Patent document 1, which suggests an electrocapillary color display apparatus of this kind, colored electrically-conductive liquids that have different contact angles of droplets are used. Examples of them include water, alcohol, acetone, formamide, ethylene glycol and a mixture thereof.

Also, in Patent document 2 describing a display device and a display apparatus utilizing a similar electrowetting phenomenon, an aqueous solution in which an electrolyte such as NaCl or $Na_2SO_4$ is dissolved, a polar liquid such as water, alcohol, acetone, formaldehyde or ethylene glycol, or a mixture thereof with other suitable liquids are listed as the electrically-conductive liquid (an electrolyte solution). Also, in Patent document 3, water and an organic solvent are used as a dispersion medium of a coloring material whose base material is a pigment.

As described above, in the electrically-conductive colored liquids that are provided conventionally, water and an organic solvent often are used as the dispersion medium of the coloring material whose base material is a pigment. However, in the case where an aqueous dispersion medium is used, it is likely to permeate through a dielectric film covering the electrode surface because water itself has a small ionic radius, and a potential window is low, so that there is a problem that a dielectric breakdown occurs easily. In particular, in order to apply a voltage to the above-noted aqueous solution so as to vary its surface energy, it is necessary to perform high-voltage driving by applying a high voltage. Moreover, as the dielectric film becomes thinner, the dielectric breakdown is more likely to occur. Further, since the colored liquid itself has a vapor pressure, the vapor pressure of the liquid causes the aqueous dispersion medium to expand considerably in volume particularly in a high temperature region, leading to breakage. Furthermore, in the case where the dispersion medium contains combustibles, breakage due to an increase in internal pressure caused by shock or deterioration may lead to leakage or ignition of the electrolyte solution. Accordingly, handling is very difficult, and there is a problem in long-term durability.

Further, in the case of using water and an organic solvent as the dispersion medium of the coloring material whose base material is a pigment, temperature variations cause molecular motion of the dispersion medium itself to vary considerably, posing a problem that the agglomeration and precipitation of the coloring material occur.

Patent document 4 suggests using an ionic colored liquid having an anion and a cation instead of the above-described aqueous dispersion medium. That is, an ambient temperature molten salt is used as an electrolyte for producing a long-life highly-stable electrochromic device having polyaniline and polythiophene as the coloring material.

However, although Patent document 4 also has the problem of the agglomeration and precipitation of the coloring material, it fails to give any consideration to dispersing and stabilizing the coloring material in the ambient temperature molten salt.

Patent document 1: JP 10(1998)-39799 A

Patent document 2: JP 2000-356750 A

Patent document 3: JP 2003-221526 A

Patent document 4: JP 2004-527902 A

DISCLOSURE OF INVENTION

The present invention was made in light of the problems described above and provides, in an image display apparatus of an electrowetting system, an ionic colored liquid that achieves enhanced durability by using an ionic colored liquid whose dispersion medium is incombustible or flame-retardant, has a low temperature region and no or extremely small vapor pressure, is nonvolatile and has small molecular motion due to temperature variations as an electrically-conductive colored liquid that is sealed and flows in a passage between layers and is moved with a voltage application, thus preventing agglomeration and precipitation of the coloring material to be blended in the ionic colored liquid so as to stabilize the dispersion of the coloring material, and an image display apparatus using the same.

An ionic colored liquid according to the present invention is an ionic colored liquid capable of moving with a voltage application. The ionic colored liquid contains as principal components at least a coloring material whose base material is a pigment, and an ambient temperature molten salt combining a cation and an anion. The coloring material has a mean volume particle diameter of equal to or smaller than 5 μm and a coefficient of variation in a volume particle size distribution of equal to or smaller than 50.

In the above description, the "principal components" refer to components contained at equal to or larger than 90% by mass. The "ambient temperature" refers to a temperature ranging from 5° C. to 35° C. The "mean volume particle diameter" is obtained by converting a mean volume into a particle diameter and can be measured using, for example, a laser diffraction particle size measuring instrument (LB-550) manufactured by HORIBA, Ltd., a laser diffraction particle size measuring instrument (SALD2100) manufactured by Shimadzu Corporation, or the like. The particle size distribution is an index showing the sizes (particle diameters) and percentages (relative particle amounts where the entire sample group is 100%) of particles contained in a sample particle group serving as a measuring object. The coefficient of variation refers to the ratio of a standard deviation to a mean.

An image display apparatus according to the present invention is an image display apparatus using the above-described ionic colored liquid. A surface energy of the ionic colored liquid is varied according to whether or not a voltage is applied to the ionic colored liquid, thereby moving the ionic colored liquid or increasing/decreasing a surface area of the liquid on a display surface side, so that an image is displayed.

DESCRIPTION OF THE INVENTION

The colored liquid according to the present invention uses an ionic colored liquid containing an ambient temperature molten salt as a dispersion medium. Since the ambient temperature molten salt, namely, an ionic colored liquid having a melting point equal to or lower than room temperature is nonvolatile, has substantially zero vapor pressure, a wide liquid temperature region, a high thermal stability and a wide service temperature range, it can prevent the leakage and ignition. Further, the ambient temperature molten salt has various preferred physical properties such as capability of low-voltage driving owing to its high ionic conductivity and low viscosity, and thus can solve the above-mentioned problems.

Furthermore, although many molten salts are hydrophilic, the present invention uses a non-aqueous ionic colored liquid containing substantially no water, so that it is possible to prevent reliably the breakage of the element due to the dielectric breakdown and volumetric expansion caused by vapor pressure that occur in the case of using an aqueous dispersion medium.

It is preferable that the ambient temperature molten salt is a non-aqueous solution containing no water as described above. However, there are, some cases where moisture in the air are absorbed and entrained inevitably. Further, the content of the contained water may be so small that the breakage does not occur by the dielectric breakdown or the volumetric expansion due to vapor pressure, namely, may be 0 to 10 parts by mass of the inevitable moisture with respect to 100 parts by mass of the ionic colored liquid in the present invention.

In the present invention, as described above, the coloring material whose base material is a pigment is dispersed in the ambient temperature molten salt so that its mean volume particle diameter is equal to or smaller than 5 µm. In this way, by using the coloring material whose mean volume particle diameter is equal to or smaller than 5 µm, it is possible to prevent the precipitation in the ambient temperature molten salt caused by long-term storage. A smaller mean volume particle diameter is more preferable. The mean volume particle diameter preferably is equal to or smaller than 3 µm and further preferably is equal to or smaller than 1 µm, and the lower limit that is producible currently is about 0.02 µm.

Further, the coloring material has a coefficient of variation in a volume particle size distribution of equal to or smaller than 50. As described above, by setting the coefficient of variation in the volume particle size distribution of the coloring material to be equal to or smaller than 50, it becomes possible to prevent the agglomeration and precipitation of particles in a wide temperature range, in particular, a high temperature region and to ensure a long-term durability.

Also, a smaller coefficient of variation is more preferable. Since the coefficient of variation indicates variations, the smaller it is, the more likely it is to be able to prevent the agglomeration and precipitation of the particles. Thus, the coefficient of variation preferably is equal to or smaller than 20. Furthermore, the coefficient of variation preferably is set to be equal to or smaller than 5. It has been found that, by doing so, repeating characteristics of switching in an electrowetting system are favorable. The lower limit of the coefficient of variation is 0.1 because the dispersion for achieving a composition uniformity in which the coefficient of variation is less than 0.1 takes extremely long time and is not practical in terms of production. Here, the electrowetting system refers to a system of displaying a color by diffusing an ionic colored liquid in the display-side space at the time of applying a voltage to the ionic colored liquid.

The contents of the ionic coloring material and the ambient temperature molten salt are 0.05 to 50 parts by mass of the ionic coloring material with respect to 100 parts by mass of the ambient temperature molten salt. If the ionic coloring material is less than 0.05 parts by mass, the viscosity is so low that variations in the particle diameter occur when employing a mechanical dispersion technique. On the other hand, if it exceeds 50 parts by mass, it becomes difficult to disperse and stabilize the coloring material, resulting in lack of storage stability. More preferably, it is 0.1 to 20 parts by mass.

The kinds of the pigment serving as a coloring base material vary depending on colors, and, for example, carbon black is used. The coloring materials other than carbon black can be inorganic pigments such as iron oxide, lead oxide, copper oxide and titanium oxide.

The ambient temperature molten salt (electrolyte) in the ionic colored liquid preferably is a 1-1 salt obtained by combining one kind of the cation that is monovalent and one kind of the anion that is monovalent. Since an electrostatic interaction between cation and anion is proportional to the product of electric charges in the ionic colored liquid, monovalent ions are selected so as to reduce the interaction between the ions, thereby making it possible to lower a melting point and a viscosity. Consequently, it becomes possible to improve low-temperature characteristics with a low temperature molten salt.

It is preferable that the above-noted cation is selected from the group consisting of 1,3-dialkylimidazolium cation represented by the chemical formula (1) below, N-alkylpyridinium cation represented by the chemical formula (2) below, tetraalkylammonium cation represented by the chemical formula (3) below and tetraalkylphosphonium cation represented by the chemical formula (4) below.

[Chemical formula 1]
[Chemical formula 2]
[Chemical formula 3]
[Chemical formula 4]

In the chemical formulae 1 to 4, R1 to R4 respectively are alkyl groups that may be the same or different and have 1 to 10 carbon atoms.

It is preferable that the above-noted anion is selected from the group consisting of $(ACl_3)nCl^-$, $(AlBr_3)nBr^-$, $Cl^-$, $Br^-$, $I^-$, $(HF)nF^-$, $BF_4^-$, $PF_6^-$, $TaF_6^-$, $WF_7^-$, $NO_3^-$, $NO_2^-$, $CF_3SO_3^-$, $(CF_3SO_2)_2N^-$, $(CF_3SO_2)_3C^-$, $(CF_3CF_2SO_2)N^-$, $CF_3COO^-$, $CF_3CF_2CF_2COO^-$, $CF_3CF_2CF_2SO_3^-$, $(CN)_2N^-$ and $CH_3COO^-$.

More specifically, it is preferable that the ionic colored liquid contains a chemical species selected from the list below.

$EMIACl_4$, $EMIAl_2Cl_7$, $EMIF.HF$, $EMIF.2.3HF$, $EMINO_2$, $EMINO_3$, $EMIBF_4$, $EMIAlF_4$, $EMIPF_6$, $EMIAsF_6$, $EMISbF_6$, $EMINbF_6$, $EMITaF_6$, $EMICH_3CO_2$, $EMICF_3CO_2$, $EMIC_3F_7CO_2$, $EMICH_3SO_3$, $EMICF_3SO_3$, $EMIC_4H_9SO_3$, $EMI(CF_3SO_2)_2N$, $EMI(C_2F_5SO_2)_2N$, $EMI(CF_3SO_2)_3C$, $EMI(CN)_2N$, $EMIVOCl_4$, $BMIACl_4$, $BMIBF_4$, $BMIPF_6$, $BMICF_3CO_2$, $BMIC_3F_7CO_2$, $BMICH_3SO_3$, $BMICF_3SO_3$, $BMIC_4H_9SO_3$, $BMI(CF_3SO_2)_2N$, $DMPIAlCl_4$, $DMPIAl_2Cl_7$, $DMPIPF_6$, $DMPIAsF_6$, $DMPI(CF_3SO_2)_2N$, $DMPI(C_2F_5SO_2)_2N$, $DMPI(CF_3SO_2)_3C$.

Incidentally, the above-noted EMI, BMI and DMPI are abbreviations for 1-ethyl-3-methylimidazolium, 1-butyl-3-methylimidazolium and dimethyl-3-propylimidazolium, respectively.

The EMI and BMI are stable toward the air and water and have a high ionic conductivity. Thus, they can move the ionic colored liquid at a high speed at a low voltage. In particular, among chemical compounds having the same anion, those having $EMI^+$ show a maximum electrical conductivity at room temperature.

Since the anions have very different fundamental physical properties depending on their kinds, it is preferable to combine the anion and the cation so as to achieve an ionic colored liquid having the following physical properties. That is, the ionic colored liquid preferably has an electrical conductivity such that an ionic conductivity at 25° C. is equal to or greater than $0.1 \times 10^{-3}$ s/cm. The ionic conductivity is set to be equal to or greater than $0.1 \times 10^{-3}$ s/cm so as to allow the electric charges to be stored more easily at an interface between a dielectric film and the ionic colored liquid. Because of an increase in an electric charge density, the electric charges repel each other, making it easier to change a surface shape (a surface energy) of the ionic colored liquid. Consequently, the ionic colored liquid can be driven at a low voltage. Although a higher ionic conductivity is more preferable, an upper limit of the ionic conductivity of a currently available ionic colored liquid is about $3.5 \times 10^{-3}$. The evaluation of the ionic conductivity of the ionic colored liquid is determined by a complex impedance method using an SUS electrode with "Impedance analyzer HP4294A" manufactured by TOYO Corporation.

Further, it is preferable that the ionic colored liquid has a viscosity of equal to or smaller than 300 cp at 25° C. Although a lower viscosity is more preferable, a lower limit of the currently available viscosity is about 60 cp. The viscosity is set to be equal to or smaller than 300 cp at 25° C. because a low-voltage driving at a voltage equal to or lower than about 50 V can be performed if the viscosity is equal to or smaller than 300 cp. It is preferable that the ionic colored liquid has a melting point of about −4° C. to −90° C.

Although the ionic colored liquid may contain a chemical compound that is solid at room temperature in some cases, a liquid that is liquid at room temperature (about 25° C.) and has a high ionic conductivity even in a low temperature region, for example, EMIF.2.3HF or the like is used in a preferred manner in the present invention.

The image display apparatus is formed as an electric-field induction type sheet-like image display apparatus in which a surface energy of the ionic colored liquid is varied according to whether or not a voltage is applied to the ionic colored liquid, thereby moving the ionic colored liquid or increasing/decreasing a surface area of the liquid on a display surface side, so that an image is displayed.

It is preferable that the image display apparatus includes display spaces between layers that are located on a front side and a back side and each provided with an electrode, with the display spaces being in communication with each other via a through hole, and that the display spaces are filled with the ionic colored liquid, the electrode layer on a display side of the display spaces is a transparent electrode, a light-scattering layer is provided inside the display spaces, and when the voltage is applied to the colored liquid, the colored liquid is diffused in the space on the display side so as to display a color.

It is preferable that the display spaces are filled with not only the ionic colored liquid but also a nonpolar liquid that is incompatible with the ionic colored liquid. The mixture ratio of the ionic colored liquid to the nonpolar liquid preferably ranges from 1:99 to 99:1, further preferably ranges from 10:90 to 90:10 and particularly preferably ranges from 20:80 to 80:20.

More specifically, the display spaces are provided between electrode layers and filled with the colored liquid, the layer on a display side of the display spaces is formed to be transparent, the layer on a non-display side thereof is formed to be the light-scattering layer, the colored liquid is moved by utilizing an external electric field, and a light reflectance of the surface of a white scattering sheet is varied according to the amount of movement of the colored liquid, so that an image is displayed. This is called a display apparatus of an electrowetting system or an electroosmosis system. In particular, a display apparatus of the electrowetting system is preferable because the liquid can be moved at a high speed.

Particularly, it is preferable that an upper layer, an intermediate layer formed of a light scatterer having a through hole, and a lower layer are provided, a display-side upper space is provided between the upper layer and the intermediate layer, a lower space is provided between the intermediate layer and the lower layer, a passage for the colored liquid that is formed by bringing these upper and lower spaces into communication with each other via the through hole is provided, the colored liquid is made to flow in or out of the display-side upper space by the electrowetting system according to whether or not a voltage is applied to the ionic colored liquid, and a colored image is displayed at the time of flowing-in and white is displayed by light scattering of the light scatterer at the time of flowing-out.

The display apparatus has a two-terminal structure in which an electrode is disposed on the upper layer and an electrode is disposed on an inner surface of the through hole, and the above-noted two terminals are connected via a switch. By turning ON and OFF the switch, the ionic colored liquid may be made to flow in the display-side upper space so as to display a colored image, and the ionic colored liquid may be made to flow out of the upper space so as to switch the screen to a white scattered screen. Alternatively, instead of the above-described two-terminal structure, a three-terminal structure may be employed. In the three-terminal structure, an upper electrode is provided on a peripheral surface of the upper space, a lower electrode is provided on a peripheral surface of the lower space, and a common electrode is disposed along an inner surface of the through hole in the white scattering sheet. The display apparatus may include an upper-side power supply circuit that is connected to the common electrode and the upper electrode and provided with a circuit opening/closing means and a lower-side power supply circuit that is connected to the common electrode and the lower electrode and provided with a circuit opening/closing means, in which by opening and closing the circuit opening/closing means of the upper-side power supply circuit and that of the lower-side power supply circuit alternately, the flowing of the ionic colored liquid into and out of the upper space is switched. With the above-described three-terminal structure, the ionic colored liquid is made to flow in and out of the upper space by opening and closing the upper-side power supply circuit and the lower-side power supply circuit alternately, so that the ionic colored liquid can be made to flow in and out of the upper space rapidly.

It is preferable to layer a dielectric layer and an insulating layer having a water repellency sequentially on a side of the upper electrode and that of the lower electrode that contact the ionic colored liquid and to dispose the water-repellent layer on a top surface that the ionic colored liquid contacts.

In other words, in order to move the ionic colored liquid at a high speed in the upper space, the through hole in the white scatterer and the lower space that are made continuous so as to allow a moving image to be displayed, it is preferable to dispose a dielectric layer and an insulating layer having a hydrophobicity on the surfaces of the upper electrode and the lower electrode or to dispose a hydrophobic layer on the surface of the insulating layer so that the hydrophobic layer becomes a hydrophilic layer at the time of applying a voltage.

It is preferable that the dielectric layer is made to contain, for example, parylene (parylene is a generic name for paraxylene-based resins) or alumina and has a thickness of about 1 to 0.1 μm.

In the through hole and the spaces described above, the ionic colored liquid and a nonpolar oil containing one or plural kinds selected from the group consisting of side-chain higher alcohol, side-chain higher fatty acid, alkane, a silicone oil and a matching oil that do not mix with the ionic colored liquid and are transparent or colored in a different color are sealed.

When using a nonpolar oil that is not compatible with the ionic colored liquid, it becomes easier for droplets of the ionic colored liquid to move in the nonpolar oil, making it possible to move the ionic colored liquid at a higher speed, compared with the case of bringing the air into contact with the ionic colored liquid.

In the sheet-like image display apparatus according to the present invention, the upper space and the lower space are partitioned off by partition walls for each pixel, and the ionic colored liquid used for each pixel is a colored transparent liquid of any of red (R), green (G) and blue (B). The ionic colored liquid is introduced in the upper space and spreads, thereby displaying a full-color image, and the ionic colored liquid is moved at a high speed, thereby displaying a full-color moving image.

Incidentally, when the display spaces that display R, G and B are considered altogether as one pixel, each of the display spaces is considered as one picture element.

As described above, the colored liquid according to the present invention uses an ambient temperature molten salt combining a cation and an anion as a dispersion medium of a coloring material so as to prepare an ionic colored liquid, which is thus nonvolatile, has substantially zero vapor pressure, a wide temperature region and a high thermal stability, whereby the breakage of the element due to the dielectric breakdown and volumetric expansion caused by vapor pressure can be prevented reliably. Further, there are various advantages such as capability of low-voltage driving owing to its high ionic conductivity and low viscosity.

Also, since the coloring material to be blended in the dispersion medium is made to have a mean volume particle diameter of equal to or smaller than 5 μm and dispersed in the ambient temperature molten salt, it can be prevented from precipitating in the ambient temperature molten salt due to long-term storage. Furthermore, since the coefficient of variation in a volume particle size distribution of the coloring material is set to be equal to or smaller than 50, it is possible to prevent the agglomeration and precipitation of particles in a wide temperature range, in particular, a high temperature region, thus ensuring a long-term durability.

The colored liquid according to the present invention is an ionic colored liquid containing at least a coloring material whose base material is a pigment, and an ambient temperature molten salt combining a cation and an anion, in which the coloring material has a mean volume particle diameter of equal to or smaller than 5 μm and a coefficient of variation in a volume particle size distribution of equal to or smaller than 50.

In other words, the pigment formed of particles is dispersed in the ambient temperature molten salt, and 0.05 to 50 parts by mass of the pigment are blended with respect to 100 parts by mass of the ambient temperature molten salt.

The ionic colored liquid is an ambient temperature molten salt formed of a 1-1 salt obtained by combining one kind of the cation that is monovalent and one kind of the anion that is monovalent and is a non-aqueous ionic colored liquid containing no water.

The cation is selected from the group consisting of 1,3-dialkylimidazolium cation, N-alkylpyridinium cation, tetraalkylammonium cation and tetraalkylphosphonium cation.

The anion is at least one selected from the group consisting of $(AlCl_3)nCl^-$, $(AlBr_3)nBr^-$, $Cl^-$, $Br^-$, $I^-$, $(HF)nF^-$, $BF_4^-$, $PF_6^-$, $TaF_6^-$, $WF_7^-$, $NO_3^-$, $NO_2^-$, $CF_3SO_3^-$, $(CF_3SO_2)_2N^-$, $(CF_3SO_2)_3C^-$, $(CF_3CF_2SO_2)N^-$, $CF_3COO^-$, $CF_3CF_2CF_2CO^-$, $CF_3CF_2CF_2SO_3^-$, $(CN)_2N^-$ and $CH_3COO^-$.

It is preferable to select the combination of the cation and the anion so that an ionic colored liquid 21 has the melting point, viscosity and ionic conductivity described below:

(1) The melting point ranges from −4° C. to −90° C. In this range, the ionic colored liquid 21 is liquid at room temperature, is nonvolatile and thus has a vapor pressure of 0, has a wide liquid temperature region and an excellent thermal stability.

(2) The ionic conductivity at room temperature (25° C.) is equal to or greater than $0.1 \times 10^{-3}$ s/cm.

(3) The viscosity at room temperature (25° C.) is equal to or smaller than 300 cp.

As the ionic colored liquid having the physical properties described above, an ionic colored liquid containing a chemical species selected from 1-ethyl-3-methylimidazolium (EMI), 1-butyl-3-methylimidazolium (BMI) and dimethyl-3-propylimidazolium (DMPI) described above is used.

As the coloring material formed of the pigment, particles of carbon black are used in the present invention. The particles have a mean volume particle diameter of equal to or smaller than 5 μm and a coefficient of variation in a volume particle size distribution of equal to or smaller than 50.

In the following, examples and comparative examples of the colored liquid will be described.

Example 1

As the coloring material, carbon black (trade name: MA100; manufactured by Mitsubishi Chemical Corporation) was used. As the ambient temperature molten salt, ambient temperature molten salt (trade name: IL-A4; manufactured by Koei Chemical Co., Ltd.) was used.

The carbon black and the ambient temperature molten salt were blended such that 10 parts by mass of the carbon black were blended with respect to 100 parts by mass of the ambient temperature molten salt, and they were stirred at 40° C. for 60 minutes so as to be dispersed homogeneously.

When the measurement was made using Dynamic Light Scattering Nanoparticle Size Analyzer (manufactured by HORIBA, Ltd.; trade name LB-550), the carbon black had a mean volume particle diameter of 1 μm and a coefficient of variation in a volume particle size distribution of 20.

Example 2

As the coloring material, carbon black (trade name: MA100; manufactured by Mitsubishi Chemical Corporation) was used. As the ambient temperature molten salt, ambient temperature molten salt (trade name: IL-A4; manufactured by Koei Chemical Co., Ltd.) was used.

The carbon black and the ambient temperature molten salt were blended such that 50 parts by mass of the carbon black were blended with respect to 100 parts by mass of the ambient temperature molten salt, and they were stirred so as to be dispersed homogeneously.

When the measurement was made using Dynamic Light Scattering Nanoparticle Size Analyzer (manufactured by HORIBA, Ltd.; trade name LB-550), the carbon black had a mean volume particle diameter of 5 μm and a coefficient of variation in a volume particle size distribution of 20.

Example 3

As the coloring material, carbon black (trade name: MA100; manufactured by Mitsubishi Chemical Corporation) was used. As the ambient temperature molten salt, ambient temperature molten salt (trade name: IL-A4; manufactured by Koei Chemical Co., Ltd.) was used.

The carbon black and the ambient temperature molten salt were blended such that 0.05 part by mass of the carbon black was blended with respect to 100 parts by mass of the ambient temperature molten salt, and they were stirred so as to be dispersed homogeneously.

When the measurement was made using Dynamic Light Scattering Nanoparticle Size Analyzer (manufactured by HORIBA, Ltd.; trade name LB-550), the carbon black had a mean volume particle diameter of 1 μm and a coefficient of variation in a volume particle size distribution of 50.

Comparative Example 1

As the coloring material, carbon black (trade name: MA100; manufactured by Mitsubishi Chemical Corporation) was used. As the ambient temperature molten salt, ambient temperature molten salt (trade name: IL-A4; manufactured by Koei Chemical Co., Ltd.) was used.

The carbon black and the ambient temperature molten salt were blended such that 60 parts by mass of the carbon black were blended with respect to 100 parts by mass of the ambient temperature molten salt, and they were stirred so as to be dispersed homogeneously.

When the measurement was made using Dynamic Light Scattering Nanoparticle Size Analyzer (manufactured by HORIBA, Ltd.; trade name LB550), the carbon black had a mean volume particle diameter of 10 μm and a coefficient of variation in a volume particle size distribution of 20.

Comparative Example 2

As the coloring material, carbon black (trade name: MA100; manufactured by Mitsubishi Chemical Corporation) was used. As the ambient temperature molten salt, ambient temperature molten salt (trade name: IL-A4; manufactured by Koei Chemical Co., Ltd.) was used.

The carbon black and the ambient temperature molten salt were blended such that 0.04 part by mass of the carbon black was blended with respect to 100 parts by mass of the ambient temperature molten salt, and they were stirred so as to be dispersed homogeneously.

When the measurement was made using Dynamic Light Scattering Nanoparticle Size Analyzer (manufactured by HORIBA, Ltd.; trade name LB-550), the carbon black had a mean volume particle diameter of 1 μm and a coefficient of variation in a volume particle size distribution of 70.

[Storage Stability Test]

The storage stability test was conducted for Examples 1 to 3 and Comparative Examples 1 and 2.

In the storage stability test, the colored liquid was left standing in a 70° C. oven for 10 days, and the particle diameter of solids in the colored liquid was measured before and after the standing using trade name: LB-550 manufactured by HORIBA, Ltd., thus examining how much the particle diameter changed through the standing. The results were evaluated on the following criteria.

The less the particle diameter changed, the less agglomeration of the particles occurred, which indicated a high storage stability.

A: the change in the mean particle diameter from an initial value was equal to or smaller than 30 nm.

B: the change in the mean particle diameter from the initial value was larger than 30 nm and smaller than 100 nm.

C: the change in the mean particle diameter from the initial value was larger than 100 nm and smaller than 500 nm.

D: the change in the mean particle diameter from the initial value was larger than 500 nm.

The results for the colored liquids in Examples 1, 2 and 3 were A, B and B, respectively. In contrast, the results for those in Comparative Examples 1 and 2 were C and D, respectively.

From these results, it was confirmed that, when the coloring material was set to have a mean volume particle diameter of equal to or smaller than 5 μm and a coefficient of variation in a volume particle size distribution of equal to or smaller than 50, the change in the particle diameter was small, the less agglomeration of the particles occurred, achieving a high storage stability.

Embodiment 1

Figure 1:
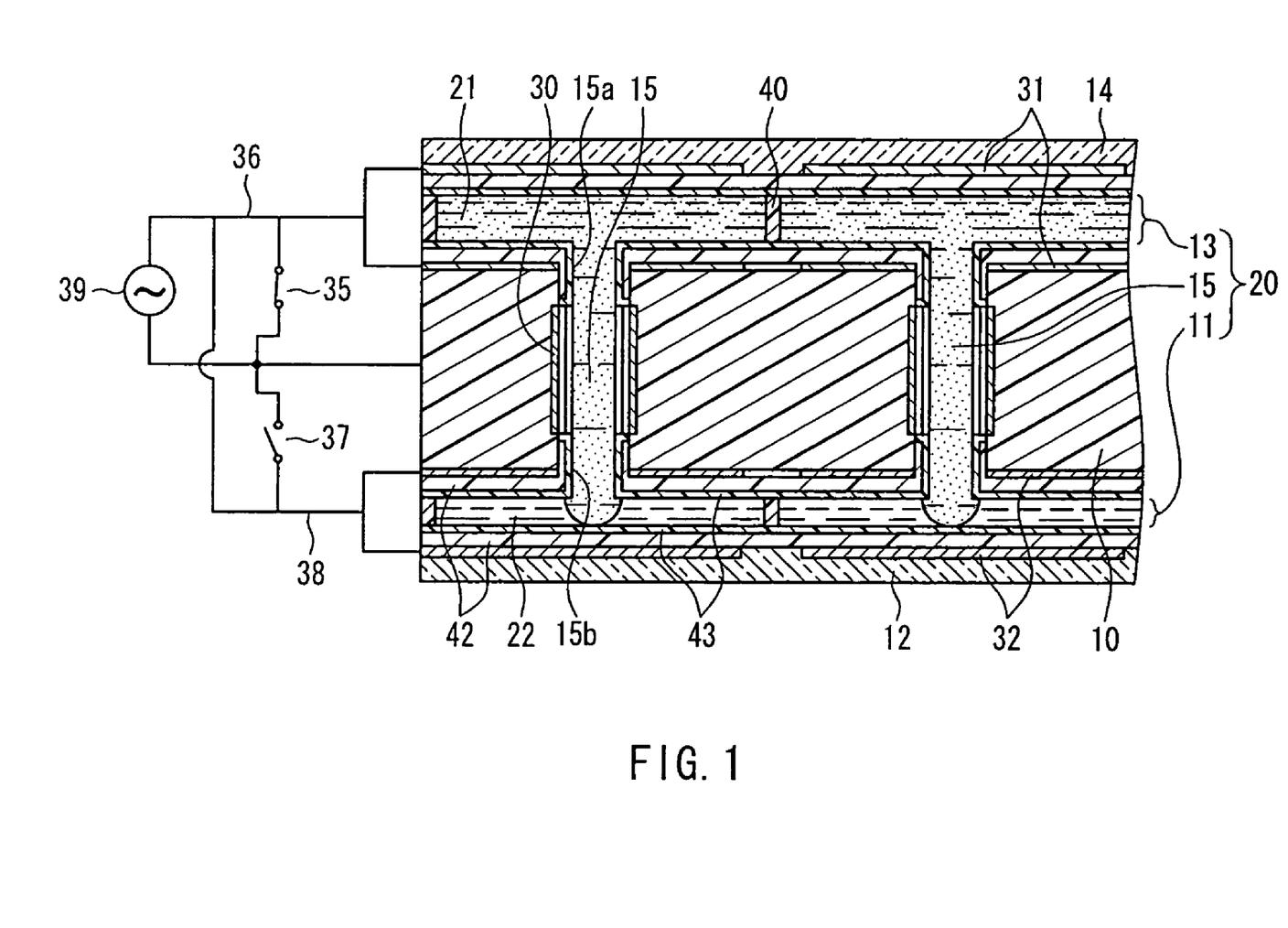
FIG. 1 is a sectional view showing a state of displaying a color where an ionic colored liquid flows into an upper space in Embodiment 1 of the present invention.
Figure 2:
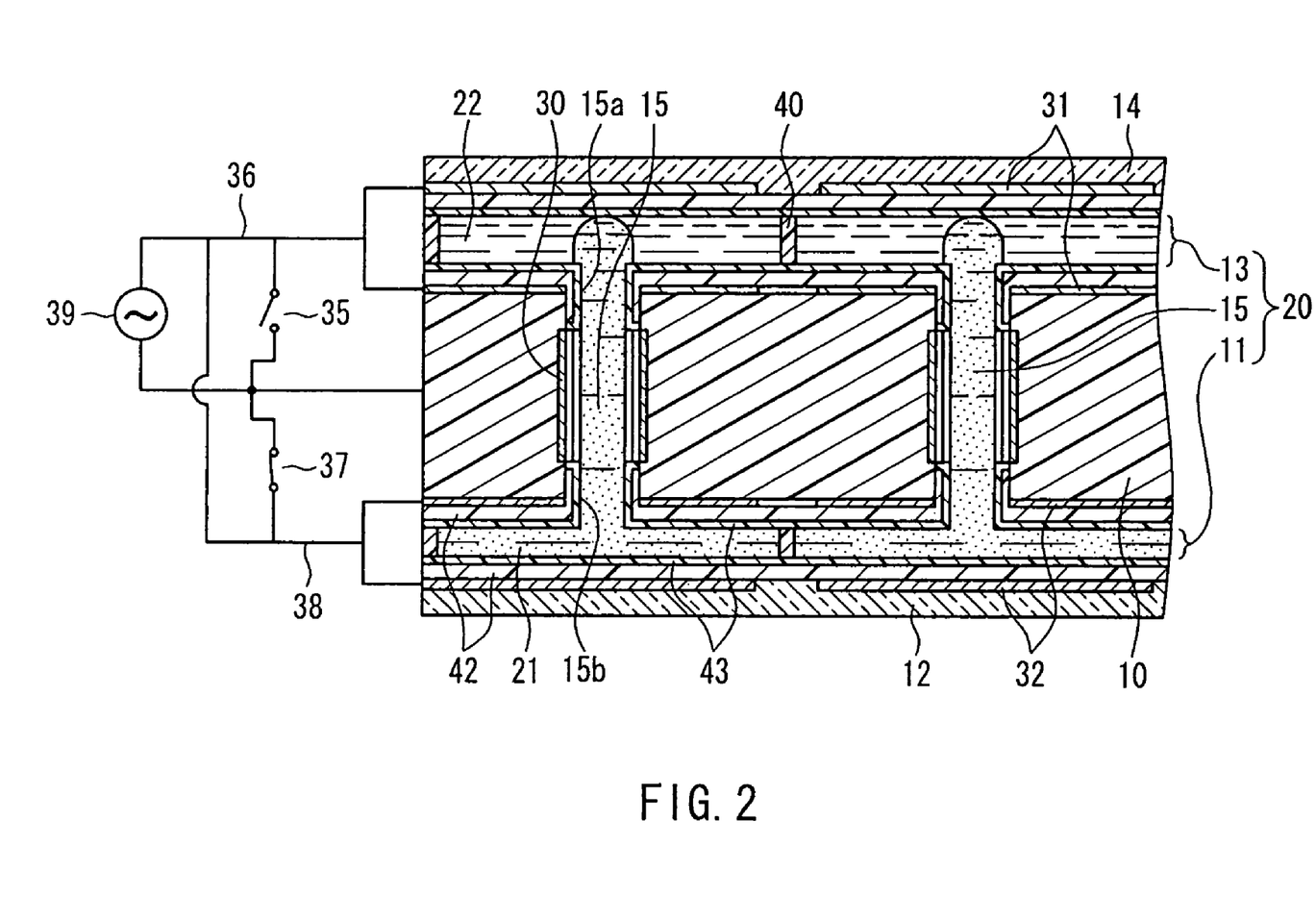
FIG. 2 is a sectional view showing a state of displaying white where the ionic colored liquid flows out of the upper space in Embodiment 1.

The following is a description of an embodiment of a sheet-like image display using the colored liquid according to the present invention. Embodiment 1 illustrated by FIGS. 1 and 2 is directed to a sheet-like image display apparatus utilizing the electrowetting system.

The above-mentioned image display apparatus included a light-scattering sheet 10, a lower electrode substrate 12 formed of a first sheet disposed such that a lower space 11 was present between the light-scattering sheet 10 and the lower electrode substrate 12, and an upper electrode substrate 14 formed of a transparent second sheet disposed such that an upper space 13 was present between the light-scattering sheet 10 and the upper electrode substrate 14. All of the light-scattering sheet 10 and the first and second sheets serving as the lower and upper electrode substrates 12 and 14 were formed of an insulating material. Incidentally, the side of the upper electrode substrate 14 corresponds to an image display side.

A through hole 15 was provided in a thickness direction of the light-scattering sheet 10 (the vertical direction in the figures). A lower end 15*b* of the through hole 15 was in communication with the horizontal lower space 11 that was perpendicular thereto, and an upper end 15*a* thereof was in communication with the horizontal upper space 13. The lower space 11, the through hole 15 and the upper space 13 that were connected continuously form an H-shaped liquid storage portion 20. As shown in FIGS. 1 and 2, the lower space 11 and the upper space 13 were partitioned off by a white partition wall 40, so that the lower space 11, the through hole 15 and the upper space 13 served as the liquid storage portion 20 formed of a sealed communication channel.

In the liquid storage portion 20, any of the ionic colored liquids 21 in Examples 1 to 3 according to the present invention and an insulating oil 22 were sealed. The oil 22 was a nonpolar oil that was incompatible with the ionic colored liquid, was transparent or colored in a color different from the ionic colored liquid 21 and contained one or plural kinds selected from the group consisting of side-chain higher alcohol, side-chain higher fatty acid, alkane, a silicone oil and a matching oil. The viscosity of the nonpolar oil preferably ranges from 0.65 cSt to 50 cSt at 25° C.

With the combined use of the nonpolar oil that is incompatible with the ionic colored liquid, a droplet of the ionic colored liquid moves in the nonpolar oil more easily, making it possible to move the ionic colored liquid at a high speed.

The ionic colored liquids that were colored in different colors were sealed in the adjacent liquid storage portions 20 partitioned off by the partition walls 40.

For the purpose of applying a voltage to or removing a voltage from the ionic colored liquid 21 so as to move the ionic colored liquid 21 and replace it with the oil 22, the present embodiment provided a three-terminal structure including a common electrode 30 disposed along the through hole 15, an upper electrode 31 disposed along the upper space 13 and a lower electrode 32 disposed along the lower space 11.

The upper electrode 31 and the common electrode 30 were connected via an upper-side power supply circuit 36 provided with an upper-side switch 35, whereas the lower electrode 32 and the common electrode 30 were connected via a lower-side power supply circuit 38 provided with a lower-side switch 37. These power supply circuits 36 and 38 were connected to a power supply 39.

The upper-side switch 35 and the lower-side switch 37 were opened and closed alternately such that, when one of them was turned ON, the other was turned OFF. In this way, an electric field was applied to the upper electrode 31 and the lower electrode 32 alternately.

The common electrode 30 was disposed along an inner peripheral surface of the through hole 15 in the light-scattering sheet 10 so as to be brought into direct contact with the ionic colored liquid 21 and the oil 22 in the through hole 15.

The upper electrode 31 was disposed on a lower surface of the second sheet serving as the upper electrode substrate 14 and an upper surface of the light-scattering sheet 10 that were located above and below the upper space 13, so as to extend over the entire length of the upper space 13. A high dielectric film 40 was layered on a space side of the upper electrode 31, and an insulating water-repellent film 41 was further layered on a space side of the high dielectric film 40, thus bringing the water-repellent film 41 into contact with the ionic colored liquid 21 and the oil 22.

Similarly, the lower electrode 32 was disposed on an upper surface of the first sheet serving as the lower electrode substrate 12 and a lower surface of the light-scattering sheet 10 that were located above and below the lower space 11, so as to extend over the entire length of the lower space 11. A high dielectric film 42 was layered on a space side of the lower electrode 32, and an insulating water-repellent film 43 was further layered on a space side of the high dielectric film 42, thus bringing the water-repellent film 43 into contact with the ionic colored liquid 21 and the oil 22.

The common electrode provided on the inner surface of the through hole 15 in the light-scattering sheet 10 was an electrode of a metal such as aluminum or copper and formed by a vacuum evaporation method, a sputtering method, an ion plating method, a dip coating method or the like.

A transparent electrode of an indium-tin oxide alloy (ITO) film or the like was used for the upper electrode 31 and the lower electrode 32.

It is preferable that the water-repellent layer disposed on the top surface of the upper space 11 and the lower space 13 is turned into a hydrophilic layer when a voltage is applied. The water-repellent layer was formed of a resin. The resin preferably is a fluorocarbon resin. When a voltage is applied to the fluorocarbon resin, electric charges spread over the entire fluorocarbon resin, accompanied by a decrease in a surface tension, so that the fluorocarbon resin becomes hydrophilic.

In order to allow a moving image to be displayed, the moving speed of the liquid has to be raised. Therefore, it is effective to provide the inner surface of the electrode in the through hole with the above-described coating that becomes hydrophilic when the circuit is closed and hydrophobic when the circuit is open.

Further, it is preferable that the dielectric layer contains parylene or alumina, for example, and has a thickness of about 1 to 0.1 μm.

As for the light-scattering sheet 10, in order to make the surface screen as white as paper when the ionic colored liquid 21 flowed out of the upper space 13 and the transparent oil 22 flowed into the upper space 13, fine particles of titanium oxide (with a refractive index of 2.76) or alumina (with a refractive index of 1.76) having a large refractive index and hollow polymer fine particles (with a refractive index of 1.46) having a small refractive index were contained in a polymeric resin for formation of a transparent sheet forming the light-scattering sheet, thereby causing diffusion on the surface of the light-scattering sheet, making it possible to achieve a color as white as paper.

The resin for forming the light-scattering sheet 10 can be either a thermoplastic resin or a thermosetting resin, and it is possible to use an epoxy resin, an acrylic resin, a polyimide resin, a polyamide resin, polycarbonate, polytetrafluoroethylene (for example, "Teflon (registered trademark) manufactured by DuPont.) or the like. Incidentally, not only the resins but also any of glass, ceramic and the like can be used.

It is preferable that the through hole 15 provided in the light-scattering sheet 10 has a diameter ranging from 0.1 μm to 100 μm. When the diameter of the through hole 15 is set to be 0.1 μm to 100 μm, it is possible not only to raise the intensity of the electric field generated in the through hole 15 at the time of bringing the common electrode 30 surrounding the through hole and the upper electrode 31 or the lower electrode 32 into conduction, but also to increase the moving speed of the ionic colored liquid moving inside the through hole 15 by the electrowetting phenomenon.

Moreover, the light-scattering sheet 10 has a thickness (a dimension from the front surface to the back surface) preferably ranging from 10 μm to 300 μm, more preferably 10 μm to 100 μm and particularly preferably about 50 μm. By setting the thickness of the light scattering sheet 10 to be very small, which is equal to or smaller than 1 mm, as described above, it is possible to provide a so-called paper display.

When the light-scattering sheet 10 is set to have a thickness of 10 μm to 300 μm, the length of the through hole 15 defining openings on both of the front and back surfaces of the above-described sheet also is 10 μm to 300 μm. Thus, the ionic colored liquid can be flowed in and out of the through hole 15 having a diameter of 0.1 μm to 100 μm and a length of 10 μm to 300 μm at a high speed by the electrowetting phenomenon.

The through hole 15 provided in the light-scattering sheet 10 can be formed by a suitable method such as a photolithography method, an anodic oxidation method, an etching method, a dyeing method or a printing method.

The second sheet to be the upper electrode substrate 14 and the first sheet to be the lower electrode substrate 12 are formed using a transparent resin sheet similar to the light-scattering sheet 10 so as to have a thickness of 100 to 1000 μm.

Also, each of the upper space 13 formed between the upper electrode substrate 14 and the upper surface of the light-scattering sheet 10 and the lower space 11 formed between the lower electrode substrate 12 and the lower surface of the light-scattering sheet 10 was set to have a vertical dimension (an air gap) of 5 to 1000 μm. It should be noted that the above-mentioned air gap is the dimension between the water-repellent films of the sheets that are opposed to each other and face the space.

In the above-described display device of the three-layer structure including three terminals in Embodiment 1, by turning ON or OFF the upper-side switch 35 and the lower-side switch 37 alternately so as to control the upper and lower voltages, it was possible to move the ionic colored liquid to the upper space 13 and the lower space 11 alternately via the through hole 15 by the electrowetting phenomenon.

FIG. 1 illustrates an initial state in which, when the upper-side switch 35 was turned ON and the lower-side switch 37 was turned OFF, the ionic colored liquid 21 was present in the upper space 13.

In FIG. 2, the upper-side switch 35 was turned OFF and the lower-side switch 37 was turned ON, whereby the ionic colored liquid 21 located in the upper space 13 was moved to the inside of the through hole 15, thus exposing the light-scattering surface of the light-scattering sheet 10 so as to turn the display surface white.

More specifically, when the upper-side switch 35 was turned ON and the lower-side switch 37 was turned OFF, the wettability of the ionic colored liquid with respect to the surfaces of the space varies in the upper space 13 on the side of the upper electrode 31 supplied with an electric field. In other words, ions (electric charges) of the ionic colored liquid present in an electric double layer near the electrode surface were attracted to the electrode surface by the electric field. The ions (electric charges) that became denser repelled each other. As a result, an interfacial tension between the ionic colored liquid and the solid surface of the electrode decreases, so that the ionic colored liquid was drawn by an external tension (a tension between a solid phase and a vapor phase), which had increased relatively, moved toward both lateral ends of the upper space 13 in its longitudinal direction. Accordingly, the ionic colored liquid 21 spread inside the upper space 13, and the ionic colored liquid 21 present in the through hole 15 in the light-scattering sheet 10 moved to the upper space 13.

When the upper-side switch 35 was turned OFF and the lower-side switch 37 was turned ON, since the electric field was removed from the upper electrode 31, the interfacial tension of the ionic colored liquid 21 returned to an intrinsic surface tension of the ionic colored liquid itself, so that the ionic colored liquid 21 inside the upper space 13 returned to the inside of the through hole 15 in the light-scattering sheet 10. At this time, the electric field was applied to the lower electrode 32 simultaneously, whereby the ionic colored liquid 21 flowing from the through hole 15 to the lower space 11 was made to spread inside the lower space 11 by a principle similar to the above.

In other words, when the upper electrode 31 was turned OFF, not only the ionic colored liquid was moved in a returning direction by the intrinsic surface tension of the ionic colored liquid, but also, by turning ON the lower electrode 32, the ionic colored liquid 21 was sucked from the upper space 13 via the through hole 15 toward the lower space 11 and moved at a high speed.

As described above, a double electrode structure was provided that was capable of raising the speed of response by controlling both of the inflow of the ionic colored liquid 21 to the upper space 13 and the outflow of the ionic colored liquid from the upper space 13 by the voltage control of both of the upper electrode 31 and the lower electrode 32.

At the time of moving the ionic colored liquid 21 among the upper space 13, the through hole 15 and the lower space 11 by the voltage control of switching between the upper electrode 31 and the lower electrode 32 as described above, the oil 22 that had been sealed without mixing with the ionic colored liquid 21 was moved to a position replaced with the ionic colored liquid 21'. In other words, when the ionic colored liquid 21 in the upper space 13 moved via the through hole 15 toward the lower space 11, the oil 22 in the lower space 11 went up along the inner surface of the through hole 15 and flowed into the upper space 13. Conversely, when the ionic colored liquid 21 in the lower space 11 moved to the inside of the upper space 13, the oil 22 in the upper space 13 moved along the inner peripheral surface of the through hole 15 and flowed to the lower space 11.

In this manner, by turning ON/OFF the upper-side switch 35 and the lower-side switch 37 alternately so as to allow the ionic colored liquid 21 to be present in the upper space 13 while the electric field was applied to the upper electrode 31, a colored display was achieved. The ionic colored liquid 21 was moved from the upper space 13 via the through hole 15 to the lower space 11, and then the upper space 13 achieves a white display because the ionic colored liquid 21 was not present any more.

As described above, the upper space 13 and the lower space 11 in the display device were partitioned off by the white partition portions 40. The ionic colored liquids 21 colored into specific colors were moved in the through holes 15, the upper space 13 and the lower space 11 that formed a circulating channel with the partition portions 40. The ionic colored liquids 21 colored into different colors were moved in the adjacent circulating channels.

When an alternating voltage of an effective voltage of 5V and a frequency of 1 KHz was applied from the power supply 39, the speed of response of droplets was 1 msec. Here, the speed of response refers to time during which a droplet located in an upper portion moves to a lower portion (or time during which a droplet located in a lower portion moves to an upper portion). The speed of response depends on the effective voltage value of the applied voltage and does not depend on the frequency very much.

The ionic colored liquid 21 was a liquid of any of cyan (C), magenta (M), yellow (Y) and black (K). Any of the ionic colored liquids was introduced and spread in the upper space 13, thereby displaying a full-color image. By moving the ionic colored liquid at a high speed, a full-color moving image was displayed.

Embodiment 2

Figure 3:
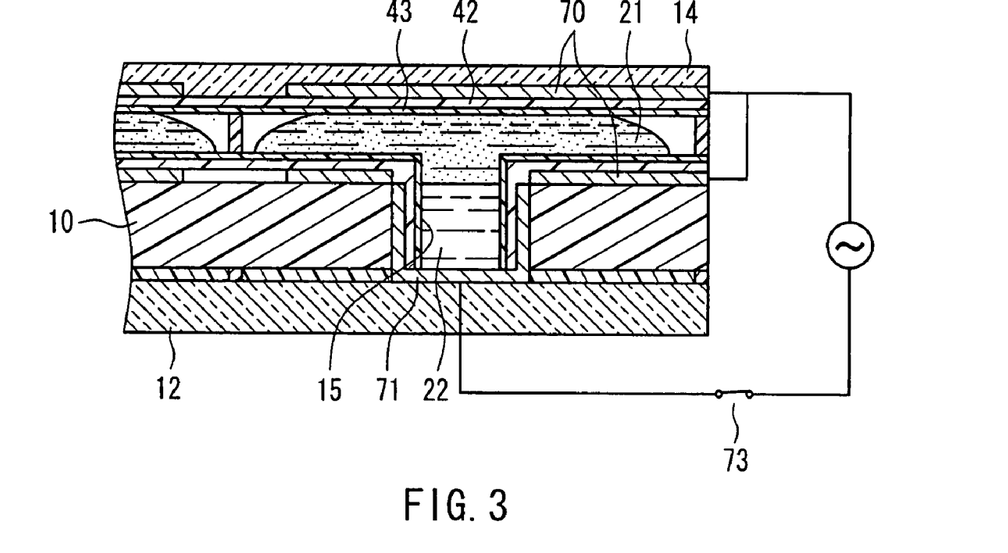
FIG. 3 is a sectional view showing a state of displaying a color where an ionic colored liquid flows into an upper space in Embodiment 2.
Figure 4:
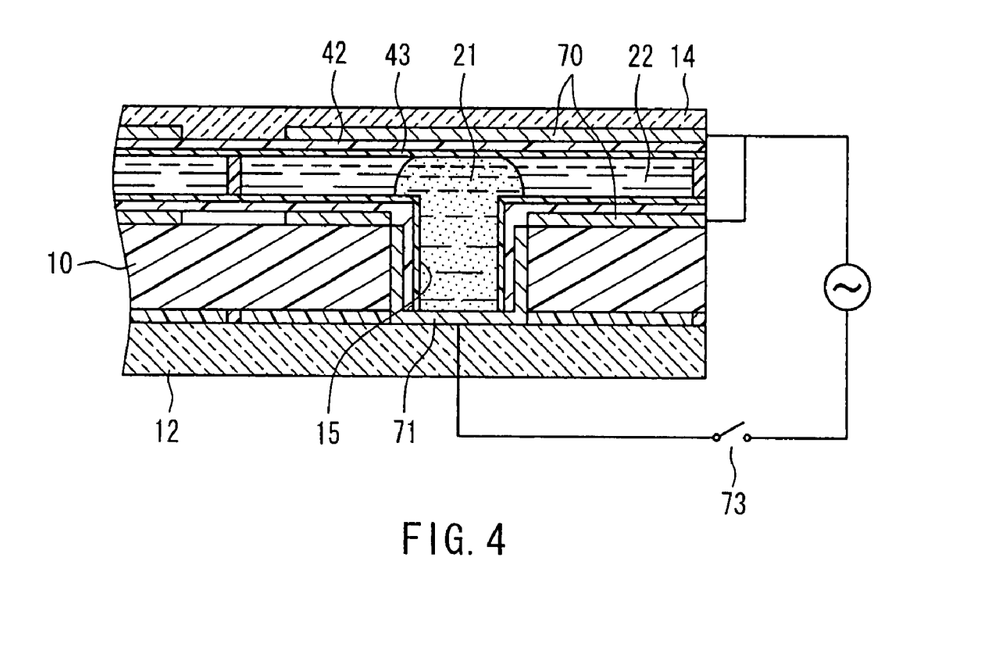
FIG. 4 is a sectional view showing a state of displaying white where the ionic colored liquid flows out of the upper space in Embodiment 2.

FIGS. 3 and 4 illustrate Embodiment 2. Unlike Embodiment 1, Embodiment 2 provided a two-terminal structure, and the number of power supply circuits was one.

A lower electrode substrate 12 was layered on a lower surface of a light-scattering sheet 10 via an electrically conductive adhesive.

An upper electrode 70 was disposed on both upper and lower surfaces of an upper space 13, namely, an upper surface of the light-scattering sheet 10 and a lower surface of the upper electrode substrate 14, whereas a lower electrode 71 was disposed so as to be exposed to an inner peripheral surface of a through hole 15 and an opening at a lower end thereof. The surface of the lower electrode 71 was coated with a thin $SiO_2$ film having a thickness of 50 nm so as to be hydrophilic.

The upper electrode 70 and the lower electrode 71 were connected to a power supply via a switch 73.

In a display device of the two-terminal structure constituted as above, an ionic colored liquid 21 was stored in the through hole 15 in the light-scattering sheet 10 and in a portion in the upper space 13 that was opposed to the through hole 15 in an initial state where the switch 37 was turned OFF. At this time, since the $SiO_2$ film on the surface was hydrophilic, the ionic colored liquid 21 was stable in the through hole 15.

When the switch 73 was turned ON, the ionic colored liquid 21 was drawn toward both ends of the upper space 13 by the electric field generated in the inner surface of the upper space 13, so that the ionic colored liquid spread in the upper space 13.

When the switch 73 was turned OFF to remove the electric field, the ionic colored liquid 21 returned to the through hole 15 by its intrinsic surface tension.

INDUSTRIAL APPLICABILITY

A sheet-like image display apparatus using a colored liquid prepared by blending a coloring material having a mean volume particle diameter of equal to or smaller than 5 μm and a coefficient of variation in a volume particle size distribution of equal to or smaller than 50 with an ionic colored liquid formed of an ambient temperature molten salt according to the present invention can be used in a preferred manner for any of electric-field induction type sheet-like display devices of not only an electrowetting system but also an electroosmosis system in which a surface energy of the liquid is varied according to whether or not a voltage is applied to the liquid, thereby moving the liquid or increasing/decreasing a surface area of the liquid on a display surface side, so that an image is displayed.

The invention claimed is:

1. An ionic colored liquid capable of moving with a voltage application, the ionic colored liquid comprising as principal components at least a coloring material whose base material is a pigment, and an ambient temperature molten salt combining a cation and an anion;
    wherein the coloring material has a mean volume particle diameter of equal to or smaller than 5 μm and a coefficient of variation in a volume particle size distribution of equal to or smaller than 50.

2. The ionic colored liquid according to claim 1, wherein the cation is at least one cation selected from the group consisting of 1,3-dialkylimidazolium cation, N-alkylpyridinium cation, tetraalkylammonium cation and tetraalkylphosphonium cation.

3. The ionic colored liquid according to claim 1 or 2, wherein the ambient temperature molten salt is at least one salt selected from the group consisting of $EMIAlCl_4$, $EMIAl_2Cl_7$, $EMIF.HF$, $EMIF.2.3HF$, $EMINO_2$, $EMINO_3$, $EMIBF_4$, $EMIAlF_4$, $EMIPF_6$, $EMIAsF_6$, $EMISbF_6$, $EMINbF_6$, $EMITaF_6$, $EMICH_3CO_2$, $EMICF_3CO_2$, $EMIC_3F_7CO_2$, $EMICH_3SO_3$, $EMICF_3SO_3$, $EMIC_4H_9SO_3$, $EMI(CF_3SO_2)_2N$, $EMI(C_2F_5SO_2)_2N$, $EMI(CF_3SO_2)_3C$, $EMI(CN)_2N$, $EMIVOCl_4$, $BMIAlCl_4$, $BMIBF_4$, $BMIPF_6$, $BMICF_3CO_2$, $BMIC_3F_7CO_2$, $BMICH_3SO_3$, $BMICF_3SO_3$, $BMIC_4H_9SO_3$, $BMI(CF_3SO_2)_2N$, $DMPIAlCl_4$, $DMPIAl_2Cl_7$, $DMPIPF_6$, $DMPIAsF_6$, $DMPI(CF_3SO_2)_2N$, $DMPI(C_2F_5SO_2)_2N$ and $DMPI(CF_3SO_2)_3C$, where the EMI, the BMI and the DMPI are abbreviations for 1-ethyl-3-methylimidazolium, 1-butyl-3-methylimidazolium and dimethyl-3-propylimidazolium, respectively.

4. The ionic colored liquid according to any of claims 1, wherein contents of the coloring material and the ambient temperature molten salt are 0.05 to 50 parts by mass of the coloring material with respect to 100 parts by mass of the ambient temperature molten salt.

5. The ionic colored liquid according to any of claims 1, which has an electrical conductivity such that an ionic conductivity at 25° C. is equal to or greater than $0.1 \times 10^{-3}$ s/cm.

6. The ionic colored liquid according to any of claims 1, which has a viscosity of equal to or smaller than 300 cp at 25° C.

7. The ionic colored liquid according to any of claims 1, which has a melting point ranging from −4° C. to −90° C.

8. An image display apparatus using an ionic colored liquid capable of moving with a voltage application, the ionic colored liquid comprising as principal components at least a coloring material whose base material is a pigment, and an ambient temperature molten salt combining a cation and an anion, wherein the coloring material has a mean volume particle diameter of equal to or smaller than 5 μm and a coefficient of variation in a volume particle size distribution of equal to or smaller than 50,     wherein a surface energy of the ionic colored liquid is varied according to whether or not a voltage is applied to the ionic colored liquid, thereby moving the ionic colored liquid or increasing/decreasing a surface area of the liquid on a display surface side, so that an image is displayed.

9. The image display apparatus according to claim 8, comprising display spaces between layers that are located on a front side and a back side and each provided with an electrode, with the display spaces being in communication with each other via a through hole,     wherein the display spaces are filled with the ionic colored liquid,     the electrode layer on a display side of the display spaces is a transparent electrode,     a light-scattering layer is provided inside the display spaces, and     when the voltage is applied to the colored liquid, the colored liquid is diffused in the space on the display side so as to display a color.

10. The image display apparatus according to claim 9, wherein the display spaces are filled with not only the ionic colored solution but also a nonpolar liquid that is incompatible with the ionic colored solution.

* * * * *